May 12, 1964  E. S. SYCHOWSKI ETAL  3,132,873
RUNNER ATTACHMENT FOR VEHICLES
Filed Nov. 15, 1962   3 Sheets-Sheet 1
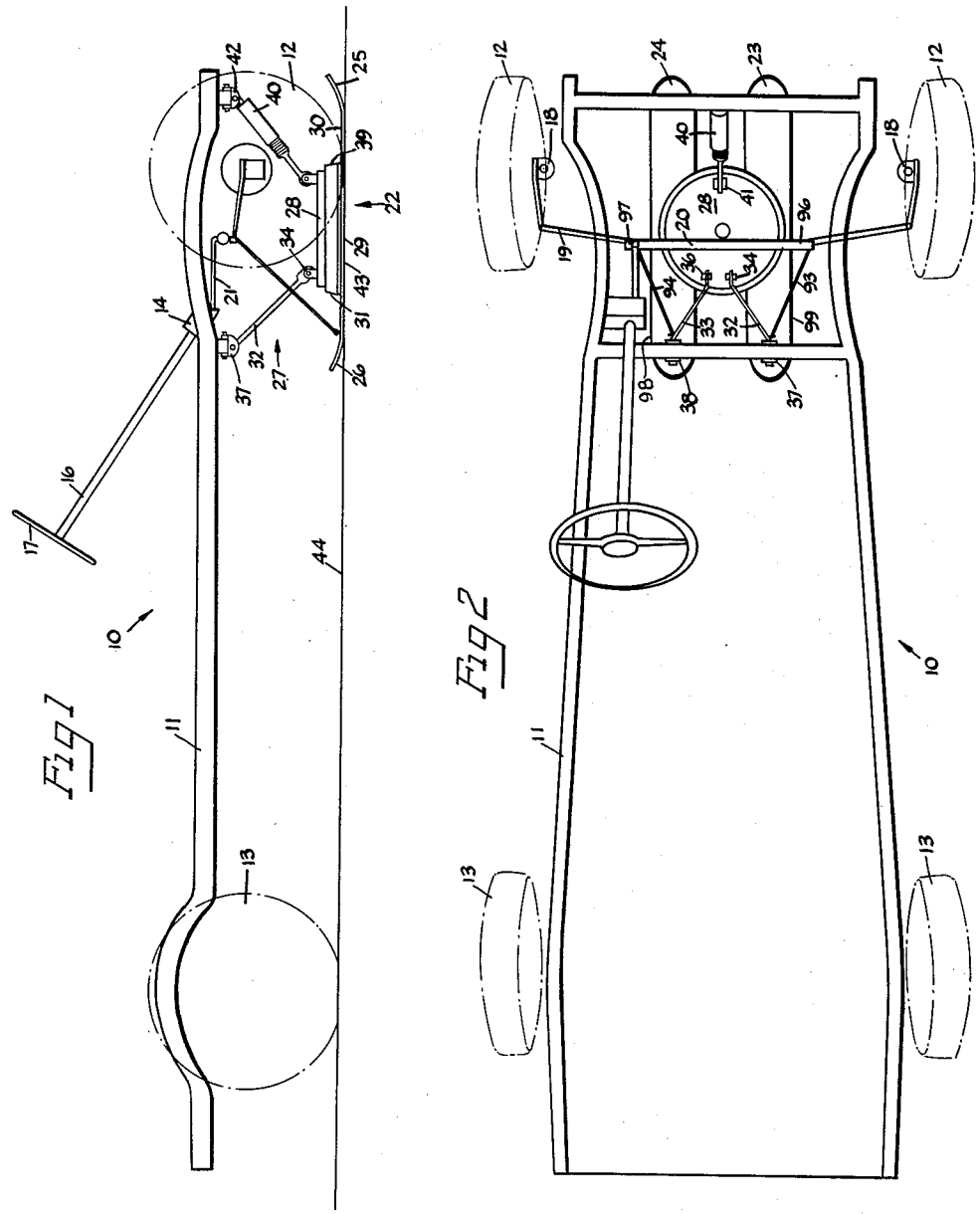
INVENTORS
Elizabeth S. Sychowski
Leigh S. Guild
BY
ATTORNEYS

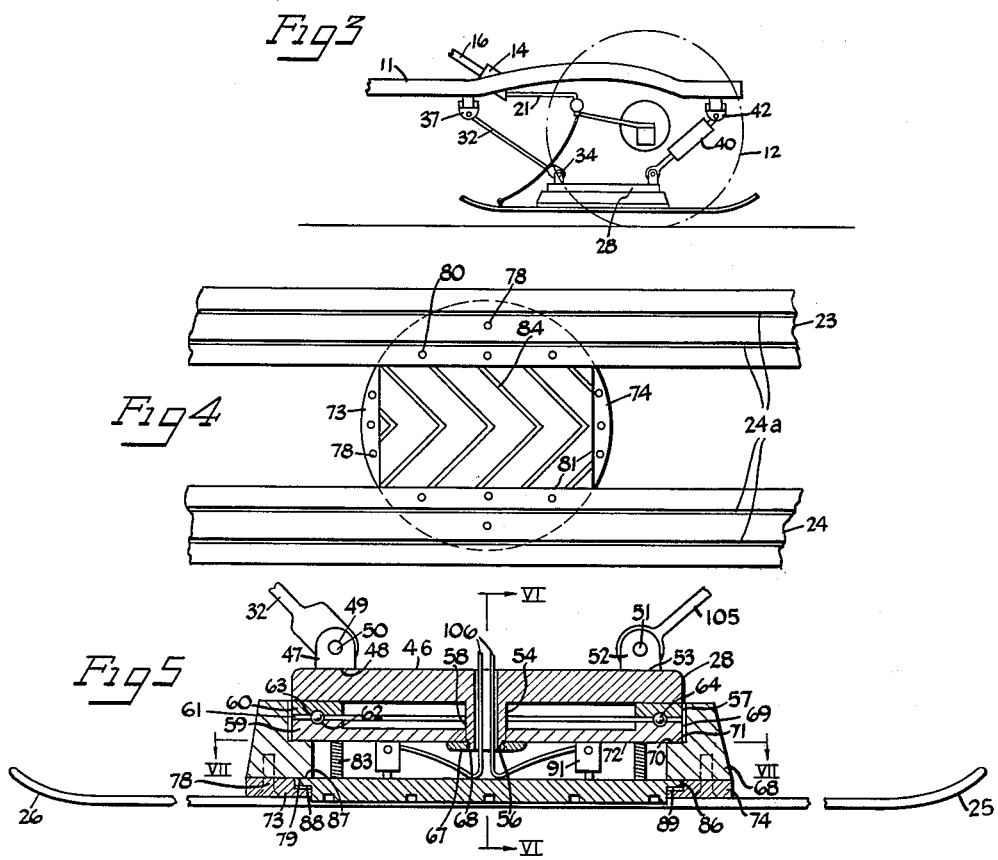

May 12, 1964    E. S. SYCHOWSKI ETAL    3,132,873
RUNNER ATTACHMENT FOR VEHICLES
Filed Nov. 15, 1962    3 Sheets-Sheet 3
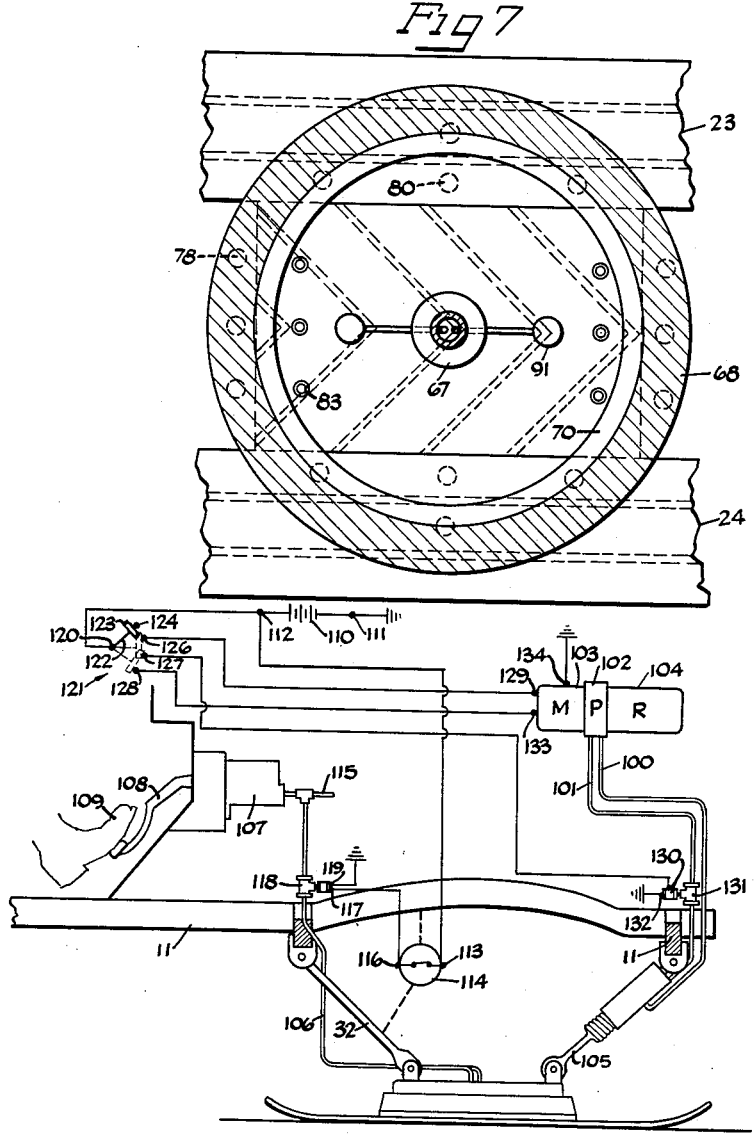
INVENTORS
Elizabeth S. Sychowski
Leigh S. Guild
BY
ATTORNEYS

United States Patent Office 3,132,873
Patented May 12, 1964

3,132,873
RUNNER ATTACHMENT FOR VEHICLES
Elizabeth S. Sychowski, 3829 N. Hoyne Ave., Chicago 18, Ill., and Leigh S. Guild, 6216 W. Montrose Ave., Chicago 34, Ill.
Filed Nov. 15, 1962, Ser. No. 237,824
5 Claims. (Cl. 280—9)

This invention relates to a runner attachment for vehicles and more particularly to a runner attachment for automotive vehicles being operated on snowy ground surfaces or other surfaces into which the wheels of a vehicle will normally be depressed. The runner attachment of the present invention is simple and dependable in operation, rugged in construction, can be easily mounted on the vehicle, can be mechanically raised and lowered from the driver's seat of the vehicle and provides a steering and braking effect on the vehicle.

A common problem encountered in operating automotive vehicles over snow and other slippery operating surfaces is inability to commence or maintain travel due to diminished frictional effect between the driving wheels of the vehicle and the ground surface. It has been determined that the frictional requirements can likewise be diminished by reducing the effect of "build-up" in front of the front wheels of the vehicle, for example, as snow will build-up in front of the wheels. It has further been determined that if a portion of the weight of the vehicle is lifted from the front wheels by means of runners or ski-like apparatus, the build-up effect of the snow or the like in front of the front wheels can be reduced so that the reduced frictional capabilities of the driving wheels will be sufficient to move the vehicle.

A feature of the present invention comprises a fluid operated cylinder to raise and lower the runner attachment. The operation of the cylinder can be controlled from the driver's seat of the vehicle by merely setting a simple switch mechanism.

Another feature of this invention comprises a brake mechanism which provides for additional braking effect on the vehicle when it is being operated on slippery surfaces. This brake mechanism is operatively connected to the main braking system of the vehicle for convenient and simultaneous operation of both braking means by the driver of the vehicle from the driver's seat.

Another feature of this invention comprises a means to operatively connect the steering mechanism of the vehicle to the runners, thereby providing additional steering effect to the vehicle on slippery surfaces. Also, by so connecting the runners to the steering mechanism the driver of the vehicle can change direction of the runners to correspond to changes in directions of the front wheels by simply steering the vehicle in the normal manner.

It is therefore an object of the present invention to provide a runner attachment for vehicles operating on slippery surfaces which is simple in operation, rugged in construction and can be easily mounted on the vehicle.

Another object of the invention is to provide a runner attachment for vehicles to transmit a portion of the weight of the vehicle from the front wheels to flat, slide runners, thereby minimizing the amount of "build-up" in front of the front wheels and minimizing the deleterious effect attendant thereto.

Another object of the invention is to provide a runner attachment which incorporates a means to furnish a braking effect on the vehicle when the attachment is lowered to the operating surface and in use.

Another object of the invention is to provide a runner attachment having a braking means operatively connected to the braking system of the vehicle for simultaneous operation therewith and operable from the driver's seat of the vehicle.

Another object of the invention is to provide a runner attachment which incorporates a means to furnish a steering effect on the vehicle when the attachment is lowered to the operating surface and in use.

Another object of the invention is to provide a runner attachment having a steering means operatively connected to the steering system of the vehicle for simultaneous operation therewith and operable from the drivers' seat of the vehicle.

Another object of the invention is to provide a runner attachment which can be raised and lowered simply and easily from the driver's seat of the vehicle as changes in the condition of the operating surface may be encountered.

Many other features, advantages and additional objects will become manifest to those versed in the art from the detailed description of the invention which follows and the accompanying sheets of drawings in which a preferred embodiment of the runner attachment incorporating the principles of the present invention is shown by way of illustrative example.

On the drawings:

FIGURE 1 is a side elevation, partly in section, diagrammatically illustrating an automotive vehicle, with parts removed, having a runner attachment applied thereto and constructed in accordance with the principles of the present invention.

FIGURE 2 is a top plan view of the vehicle of FIGURE 1 illustrating the relative location of the runner attachment to the vehicle intermediate the front wheels of the vehicle.

FIGURE 3 is a fragmentary elevational view of the runner attachment of FIGURE 1 illustrated in a raised position.

FIGURE 4 is a fragmentary bottom plan view of the runner attachment illustrating a brake shoe positioned between the two runners.

FIGURE 5 is a fragmentary side elevational sectional view illustrating details of the braking portion of the present invention.

FIGURE 6 is an elevational sectional view of the runner attachment taken substantially along lines VI—VI of FIGURE 5.

FIGURE 7 is a fragmentary sectional plan view taken substantially along lines VII—VII of FIGURE 5.

FIGURE 8 is a partially schematic and diagrammatic view of the control apparatus of the present invention.

As shown in the drawings:

Although the principles of the present invention are of utility in any wheeled ground vehicle, a particularly useful application is made to self-propelled vehicles and an illustrative embodiment herein shown consists of an automotive vehicle.

A generally diagrammatic view of a vehicle incorporating the principles of the present invention is shown generally at 10 in FIGURES 1 and 2 wherein is illustrated an automobile comprising a body frame 11 and a pair of front and rear wheels 12 and 13 respectively. Firmly affixed to the frame 11 is a journal as at 14 adapted to rotatably carry an upwardly rearwardly extending steering column as at 16 having a steering wheel 17 affixed to the driving end thereof for use by the operator of the vehicle in steering the vehicle. The front wheels 12 are rotatably connected to the frame 11 by means of steering collars 18 and are adapted for steering purposes to rotate about a vertical axis relative to the frame 11. Linkage arms 19 connect the steering collars 18 to a spacer bar 20, thereby assuring simultaneous and aligned movement of the two front wheels 12. To convert angular movement of the steering column 16 to lineal, lateral movement of the spacer bar 20, a traverse bar 21 is connected to the operating end of the steering column 16 and pivotally connected to the spacer bar 20. The relation of the angular movement of the steering column 16 to the lineal movement of the spacer bar 20 is such that rotation of the steering wheel 17 in a clockwise direction as viewed from the rear of the vehicle will cause spacer bar 20 to move laterally leftwardly thereby imparting a clockwise rotation to the front wheels, 12 when viewed from the top of the vehicle, through linkage arms 19. It is understood, therefore, that when the vehicle is being operated forwardly a clockwise rotation of the steering wheel 17 will effect a rightward turn of the vehicle.

A runner attachment embodying the principle of the present invention is shown generally at 22 and comprises a pair of runners 23 and 24 arcuately upwardly inclined at both ends as at 25 and 26 and having longitudinal ribs as at 24a. Runners 23 and 24 are cambered to a desired amount either positively or negatively. To ensure an aligned spaced relation between runners 23 and 24 to provide vertical and rotatable movement of the runners relative to the frame 11, a support shown generally at 27 comprising a journal assembly 28 is mounted transversely across and is affixed to a central portion 29 of an upper surface 30 of the runners 23 and 24. A rearward portion 31 of the journal assembly 28 is movably connected to the frame 11 by means of support arms 32 and 33 pivotally connected as at 34 and 36 to the journal assembly 28 and as at 37 and 38 to the frame 11. A forward portion 39 of the journal assembly 28 is movably connected to the frame 11 by means of a telescopically extensible fluid operated cylinder shown at 40 pivotally connected to the journal assembly 28 as at 41 and to the frame 11 as at 42.

As mentioned, cylinder 40 is telescopically extensible and in an extended position as illustrated in FIGURE 1, the lower surfaces 43 of the runners 23 and 24 are at or near a level of the ground surface as shown at 44. A retraction of the cylinder 40, as illustrated in FIGURE 3, effectively raises the lower surfaces 43 of runners 23 and 24 by moving the journal assembly 28 forwardly and upwardly relative to the frame 11. The proper balancing of the support assembly 27 and the runners 22 and 23 effectively maintains a parallel relation between the runners 23 and 24 and the ground surface 44 as the runners are raised or lowered.

The journal assembly 28 provides for angular movement of the runners in a plane parallel to the ground surface 44 and for that purpose comprises an annular disc member 46 (FIGURE 5) pivotally connected to support arms 32 and 33 by means of upwardly extending flanges as at 47 firmly affixed to the disc member 46 as at 48 and bored as at 49 to receive a bearing pin as at 50. An aperture (not shown) is formed in the receiving ends of support arms 32 and 33 in registry with the bore holes 49 of flanges 47 to receive the bearing pin 50 and thereby provide for pivotal movement between support arms 32 and 33 and the journal assembly 28. An aperture (not shown) is also formed in the receiving end of the cylinder 40 to receive a bearing pin 51 which is carried by a flange 52 firmly connected as at 53 to the journal assembly 28. Disc member 46 has a downwardly extending cylindrical collar portion 54 depending centrally therefrom and externally threaded as at 56.

To provide rotatable movement of the runners 23 and 24 relative to the frame 11 an annular bearing member generally shown at 57, centrally apertured as at 58 is disposed below the disc member 46 and comprises a lower bearing half 59 and an upper bearing half 60 spaced as at 61 and forming bearing races to carry circumferentially spaced ball bearings as at 64. To provide an assembled relation between disc member 46 and bearing member 57 a lock cap 67 is threadedly engaged with the distal end 68 of the collar 54. It will be understood, therefore, that the lower and upper bearing halves 59 and 60 are free to rotate relative to each other.

In accordance with the principles of the present invention, the runners 23 and 24 are maintained in spaced parallel relation and for this purpose a journal block 68 surrounds the outer perimeter of the bearing member 57 and is fixedly connected to the lower bearing half 59 as at 69. An indent formed circumferentially around the inner periphery of the journal block 68 forms a shoulder as at 70 which is fixedly secured to a marginal portion 71 of a lower surface 72 of the lower bearing half 59.

Runner plates 73, 74, 76 and 77 are secured by screw means as at 78 to a lower surface 79 of the journal block 68 and provide a support means for runners 23 and 24 which are secured thereto by screw means as at 80.

As is best seen in FIGURE 4, the inner vertical edges 81 of the runner plates 73, 74, 76 and 77 comprise a rectangle into which is inserted a rectangular brake shoe member 82 connected to the lower bearing half 59 by means of downwardly depending coil springs 83. The brake shoe 82 is formed with a series of V-notches as at 84 arranged to point in the forward direction of the runners 23 and 24. The brake shoe 82 has flanges 86 and 87 on forward and rearward portions thereof which are disposed within a cavity 88 formed by the runner plates 73 and 74 and the lower surface 79 of the journal block 68. It will be understood that flanges 86 and 87 are sized to permit vertical movement within cavities 88 and 89 to provide for vertical movement of a lower surface 90 of the brake shoe 82 above and below the lower surfaces 43 of the runners 23 and 24. Thus, when the runners are in a lowered position and sliding over a slippery ground surface, a downward movement of the brake shoe 82 will cause the lower surface 90 of the brake shoe to drop below the lower surface 43 of the runners 22 and 23 and the V-notched grooves 84 formed in the brake shoe 82 will provide a substantial frictional effect between the brake shoe and the ground surface thereby effecting a reduction in speed of the vehicle.

In order to provide a vertically downward movement of the brake shoe 82 a plurality of telescopically downwardly extensible fluid operated brake cylinders 91 are firmly secured to the lower bearing half 59 and the brake shoe 82. Operation of cylinders 91 imparts a vertically downward force to the brake shoe 82 within the limits defined by cavities 88 and 89 in runner plates 73 and 74 and upon retraction of cylinders 91 the coil springs 83 move the brake shoe vertically upwardly until the flanges 86 and 87 of the brake shoe 82 engage in abutting relation the lower surface 79 of the journal block 68.

Referring again to FIGURES 1 and 2, a pair of force transmitting means such as link chains or the like are shown at 93 and 94 and are connected to outer ends 96 and 97 of the spacer bar 20 and to rearward portions 98 and 99 of runners 23 and 24 respectively. Lateral movement of the spacer bar 20 as determined by angular movement of the steering wheel 17 will be transmitted by link chains 93 and 94 to the rearward portions 98 and 99 of the runners 23 and 24. Therefore, when the runner attachment is in a lowered position and the runners 23 and 24 are in sliding contact with the ground surface 44 an operator of the vehicle sitting in the driver's seat (not shown) can impart a steering effect to the vehicle by means of the front wheels 12 and runners 23 and 24 by merely operating the steering wheel 17 in the usual manner.

As was previously mentioned, a vertical movement of the runner attachment 22 relative to the body frame 11 is provided by the cylinder 40, and vertically downward movement of the brake shoe 82 is provided by cylinders 91. Cylinder 40 is operated by means of pressurized fluid and as is illustrated in FIGURE 8, the cylinder 40 is connected by means of conduits 100 and 101 to a fluid pump or compressor 102 mounted intermediate a pump motor 103 and a fluid reservoir 104. The pump 102 is arranged to pressurize the fluid contained within the reservoir 104 and the conduits 100 and 101 to give axial movement to a piston (not shown) carried within the cylinder 40 and secured to a connecting arm 105 which is pivotally connected to the journal assembly 28. The pump 102 and the motor 103 are reverse acting, that is, can be rotated alternately clockwise and counterclockwise. Rotation of the pump 102 in one direction will pressurize the fluid contained in conduit 100 to force the piston in cylinder 40 in an upward direction to raise the runner attachment 22, and a rotation of the pump 102 in an opposite direction will pressurize the fluid in conduit 101 to force the piston in a downwardly direction, thereby lowering the runner attachment 22.

Brake cylinders 91 are connected by conduit 106 to a master cylinder 107 of the main braking system of the vehicle. A piston-cylinder arrangement (not shown) incorporated within the master brake cylinder 107 is actuated by a foot pedal or the like 108 which is operated by a foot of the driver of the vehicle. Although it is not illustrated in the drawings, it will be understood by those skilled in the art that all of the wheels of the vehicle will incorporate a braking means operable from the master brake cylinder 107. A conduit 115 is illustrated extending from the master brake cylinder 107 for the purpose of communicating fluid pressurized within the cylinder 107 to the braking means at each of the wheels of the vehicle.

FIGURE 8 diagrammatically illustrates a system for control of the operation of the runner attachment from a position generally described as the driver's seat of the vehicle. A source of electrical energy, such as a storage battery or the like, is shown at 110, one terminal of which is connected to "ground" as illustrated at 111. A second battery terminal 112 is connected to a terminal 113 of an actuating switch 114 which has a second terminal 116 connected to a terminal 117 of a normally closed solenoid valve 118 having a second terminal 119 connected to "ground." The solenoid valve 118 is mounted in the conduit line 106 connecting the master brake cylinder 107 and the brake cylinders 91.

Battery terminal 112 is also connected to a terminal 120 of a control switch shown generally at 121. The control switch 121 has a selector arm 122 having a contact member 123 pivotally operable to engage in contact relation an "off" terminal 124 and terminals 126, 127 and 128. Terminal 126 is connected to terminal 129 of the motor 103. Terminal 127 is connected to terminal 130 of a normally closed solenoid valve 131 which has a second terminal 132 connected to "ground." The solenoid valve 131 is mounted in the conduit 101 connecting the pump 102 to the cylinder 40. The contact 128 of control switch 121 is connected to a second terminal 133 of the motor 103. Motor 103 is a dual-wound motor adapted for clockwise and counterclockwise rotation and for that purpose has a single ground terminal 134 connected to both windings of the motor.

To describe the operation of the runner attachment, it may be assumed that the operator of the vehicle has encountered a slippery operating surface and is desirous of lowering the runner attachment to its operational position. Selector arm 122 of control switch 121 is rotated in a clockwise direction until contact member 123 engages contacts 126 and 127 as illustrated by dotted lines 136. Electrical circuitry will thereby be established between the battery 110 and the solenoid valve 131 thereby opening the solenoid valve for effecting communication between the pump 102 and the cylinder 40. Electrical circuitry is also established between the battery 110 and one winding of the motor 103 for effecting rotation of the motor and the pump 102 in one direction to pressurize fluid at one end of the piston carried in the cylinder 40, thereby extending the connecting arm 106 downwardly and moving the runner attachment to its operating position. As the runner attachment moves vertically downwardly the actuating switch 114, which is engaged in switching relation to the frame 11 and the support arm 32 to make contact as the runner attachment moves downwardly, energizes and opens the solenoid valve 118 for effecting communication between the master brake cylinder 107 and the brake cylinders 91 of the journal assembly 28. With the runner attachment in its operating position, the driver of the vehicle can through the steering wheel 17 and the foot pedal 108, effect steering and braking of the vehicle by means of the runners 23 and 24.

When the condition of the operating surface no longer requires the use of the runner attachment, the selector arm 122 of the control switch 121 is rotated clockwise until the contact member 123 engages terminals 127 and 128. Electrical circuitry is thereby maintained between the battery 110 and the solenoid valve 131 and electrical circuitry is established between the battery 110 and the second terminal 133 of the motor 103 to effect an opposite rotation of the motor and the pump 102 to provide pressurized fluid to conduit 100 connected to cylinder 40 at an opposite side of the piston carried therein to effect retraction of connecting arm 105 and a vertically upward movement of the runner attachment to its inoperative position. As the runner attachment moves upwardly actuating switch 114 is opened, thereby deenergizing solenoid valve 118 and precluding communication of the master brake cylinder 107 and the brake cylinders 91. After the runner attachment has reached its inoperative position, the selector arm 122 of control switch 121 is thereupon rotated counterclockwise from its position illustrated in dotted lines at 137 to its "off" position (as shown in full lines) whereby contact member 123 is in contact with dead head terminal 124.

It should be noted that the control system illustrated diagrammatically in FIGURE 8 is a semi-automatic system. However, as will be understood by those versed in the art, minor modifications could be made to this system to provide for more automatic operation.

Accordingly, there has been provided a runner attachment for a vehicle which enhances operation of the vehicle over slippery surfaces, especially through snow which builds up in front of the front wheels of the vehicle. Further, the runner attachment provides a steering and braking effect on the vehicle. The attachment is operable from the driver's seat of the vehicle, and is simple in construction, dependable in operation and can be easily mounted on the frame of the vehicle.

Although we have herein set forth and described our invention with respect to certain specific principles and details thereof, it will be understood by those skilled in the art that these may be varied without departing from the spirit and scope of the invention as set forth in the hereunto appended claims.

We claim as our invention:

1. In combination with an automotive vehicle having a driver's seat, a body frame and a fluid operated braking system,
    a runner attachment comprising
    at least one runner disposed lengthwise under the vehicle intermediate the front wheels of the vehicle,
    a support including a telescopically extensible cylinder and a journal assembly connected to said frame for movably suspending said runner from said frame and operable from the driver's seat, and
    braking means depending downwardly from said journal member and operatively connected to said braking system of said vehicle,
        said braking means including a brake shoe and means connecting said brake shoe to said journal member for effecting vertical movement of said brake shoe relative to said journal member and said runner.

2. In combination with an automotive vehicle having a driver's seat, a body frame and a fluid operated braking system operated from the driver's seat,
    a runner attachment for said vehicle comprising a plurality of parallel spaced runners disposed lengthwise under the vehicle intermediate the front wheels of the vehicle, a journal assembly having a rotatable bearing member,
said runners being fixedly connected to said bearing member,
support arms operated from said driver's seat and including a telescopically extensible cylinder connected to said frame and said journal assembly for movably suspending said journal from said frame, and
braking means movably suspended from said bearing member and including at least one fluid operated brake cylinder and a brake shoe fixedly connected to said brake cylinder,
said brake cylinder being operatively connected to said braking system of said vehicle for operating simultaneously with said braking system.

3. A runner attachment for an automotive vehicle having a body frame, a braking system and a driver's seat comprising, in combination,
a plurality of runners disposed lengthwise under the vehicle intermediate the front wheels of the vehicle,
a support including a journal assembly connected to and depending downwardly from said frame for movably suspending said runners from said frame,
means operative from said driver's seat and connected to said support for effecting vertical movement of said support relative to said frame,
said runners being connected to said journal assembly,
said journal assembly including a rotatable bearing member,
a plurality of telescopically extensible brake cylinders fixedly connected to and depending downwardly from said bearing member,
a brake shoe fixedly connected to said brake cylinders, and
means operative from said driver's seat and operatively connected to said braking system of said vehicle and said brake cylinders of said runner attachment for effecting downward movement of said brake shoe simultaneously with the operation of said braking system.

4. A runner attachment for an automotive vehicle having a body frame, a braking system and a driver's seat comprising, in combination,
a plurality of runners disposed lengthwise under the vehicle intermediate the front wheels of the vehicle,
a support including a telescopically extensible fluid operated cylinder and a journal assembly pivotally connected to and depending downwardly from said frame for vertically movably suspending said runners from said frame,
a source of pressurized fluid,
means operative from said driver's seat and connected to said cylinder for communicating said fluid to said cylinder and thereby effecting vertical movement of said support relative to said frame,
said runners being connected to said journal assembly,
said journal assembly including a rotatable bearing member,
a plurality of telescopically extensible brake cylinders fixedly connected to and depending downwardly from said bearing member,
a brake shoe fixedly connected to said brake cylinders, and
means operative from said driver's seat and operatively connected to said braking system and said brake cylinders for effecting downward movement of said brake shoe simultaneously with the operation of said braking system.

5. A runner attachment for an automotive vehicle having a body frame, a steering mechanism, a hydraulically operated braking system and a driver's seat comprising, in combination,
a pair of runners disposed lengthwise under the vehicle intermediate the front wheels of the vehicle,
a support for vertically movably suspending said runners from said frame,
said support comprising a journal assembly,
a pair of support arms pivotally connected to said frame and said journal assembly and a telescopically extensible fluid operated cylinder pivotally connected to said frame and said journal assembly,
said journal assembly including a rotatable bearing member,
a reservoir of fluid,
a pump for pressurizing said fluid in said reservoir, conduit means communicating said reservoir and said cylinder,
means operative from the driver's seat for controlling the operation of said pump and thereby effecting communication of said fluid to said cylinder and vertical movement of said runners,
a plurality of telescopically extensible hydraulically operated brake cylinders connected to said bearing member and depending downwardly therefrom intermediate said runners,
a brake shoe fixedly connected to said brake cylinders and adapted for vertical movement above and below said runners,
means for operatively connecting said brake cylinders and said braking system of said vehicle for effecting vertical movement of said brake shoe simultaneously with the operation of said brake system, and
a force transmitting members connecting said runners to said steering mechanism of said vehicle for effecting corresponding and contemporaneous movement of said runners and said steering mechanism.

References Cited in the file of this patent

UNITED STATES PATENTS

| | | |
|---|---|---|
| 1,385,251 | Jenkins | July 19, 1921 |
| 1,552,353 | Shunway | Sept. 1, 1925 |
| 1,733,313 | Olson | Oct. 29, 1929 |
| 2,867,444 | Henning et al. | Jan. 6, 1959 |
| 2,937,719 | Aikman | May 24, 1960 |